United States Patent [19]
Daly et al.

[11] Patent Number: 5,748,896
[45] Date of Patent: May 5, 1998

[54] REMOTE NETWORK ADMINISTRATION METHODS AND APPARATUS

[75] Inventors: Una T. Daly, Saratoga; Ying-Kuei Ann Huang, Cupertino; Robert D. Parker, San Jose; Mary E. Firenze, Los Altos, all of Calif.

[73] Assignee: Apple Computer, Inc., Cupertino, Calif.

[21] Appl. No.: 605,325

[22] Filed: Dec. 27, 1995

[51] Int. Cl.$^6$ .................................................. G06F 15/00
[52] U.S. Cl. ...................... 395/200.53; 395/683; 395/712
[58] Field of Search ........................ 395/200.1, 200.2, 395/200.09, 200.11, 200.12, 683, 284

[56] References Cited

U.S. PATENT DOCUMENTS

| | | | |
|---|---|---|---|
| 4,949,248 | 8/1990 | Caro | 364/200 |
| 5,276,789 | 1/1994 | Besaw et al. | 395/140 |
| 5,287,343 | 2/1994 | Nakamura et al. | 370/13.1 |
| 5,287,461 | 2/1994 | Moore | 395/275 |
| 5,341,477 | 8/1994 | Pitkin et al. | 395/200.01 |
| 5,426,421 | 6/1995 | Gray | 395/182.03 |
| 5,491,791 | 2/1996 | Glowny et al. | 395/183.13 |
| 5,515,508 | 5/1996 | Pettus et al. | 395/200.01 |
| 5,586,255 | 12/1996 | Tanaka et al. | 395/800 |
| 5,600,797 | 2/1997 | Marshall | 395/200.11 |
| 5,619,656 | 4/1997 | Graf | 395/200.11 |

*Primary Examiner*—William M. Treat
*Assistant Examiner*—Saleh Najjar
*Attorney, Agent, or Firm*—Hickman Beyer & Weaver

[57] ABSTRACT

A method for managing network services on the plurality of network servers in a computer network. The method includes the step of providing at least one service component in a component repository. The service component corresponds to one of the network services. There is also included the step of providing a server manager component, which communicates with the component repository to ascertain the presence of the service component. Additionally, the method includes the step of executing a service object associated with the service component. When executed, the service object communicates with the plurality of network servers to obtain network service instantiation data relating to instantiations of the one of the network services on the plurality of network servers. The method also includes the step of passing the network service instantiation data to a server manager window component for displaying a status of the instantiations responsive to the network service instantiation data.

20 Claims, 17 Drawing Sheets

FIG. 5B-3

REMOTE NETWORK ADMINISTRATION METHODS AND APPARATUS

BACKGROUND OF THE INVENTION

The present invention relates to methods and apparatus for managing network services in a computer network. More specially, the invention relates to improved methods and apparatus for computer network management that are highly flexible and easily extensible.

There are many types of computer networks in existence. They are known by various names, including Local Area Network (LAN), Wide Area Network (WAN), Internet, and the like, and may be implemented in accordance with a variety of known architectures. FIG. 1 illustrates an example of a computer network architecture commonly known as a client-server architecture. In the client-server network of FIG. 1, there are a plurality of servers 10 coupled to a network bus 12. A server 10 is typically implemented by a computer or a workstation that is special purposed, e.g., large disk space, high speed CPU, multiple LAN connections, etc., while network bus 12 may be implemented by any of the known network routing media such as coaxial cables, multi-strand cables, fiber optic cables, or even a wireless medium. A plurality of client terminal 14, representing known computers or computing terminals, are coupled to the same network bus 12, each of which is capable of communicating with any one of servers 10 or other terminals 14 using one of the known network protocols such as AppleTalk™, TCP/IP, and the like.

On servers 10, there are installed instantiations of network service applications, which are typically software implemented, for performing programmed tasks. Examples of such network service applications include print service, e-mail service, file service, and the like. A print service application manages the printer or print queue associated with a server, thereby enabling client terminals 14 to utilize that printer for their printing needs. An e-mail service application performs e-mail management and routing tasks, permitting client terminals 14 to communicate among one another.

A server 10 may be coupled to one of the network's central file storage facilities, e.g., one of the known persistent memory devices (omitted in FIG. 1 for clarity) such as a hard disk, a RAID (redundant arrays of inexpensive disks) system, an optical storage device, and the like. A file service instantiation installed on that server 10 performs tasks related to file management for the benefit of users on client terminals 14. Such file service tasks include access privilege management, storage space management, and the like. The number and types of network services available to a network are practically limitless.

As mentioned earlier, instantiations of these network services are installed on the network servers. A network service application, e.g., one of the aforementioned print service, file service, or e-mail service applications, may have many instantiations, either on the same server or on different servers. For example, most or all servers 10 in FIG. 1 may each have a print service instantiation installed to manage a network printer. Further, a given service instantiation on a server may service multiple client terminals simultaneously. Likewise, a client terminal may establish a logical session with multiple services simultaneously, either a single server or on multiple servers.

The network service instantiations on servers 10 are managed by a network administrator, who is responsible for setting attributes and parameters for the services, maintaining and upgrading the services, and the like. Typically, these administration tasks are performed via a network service management application. In a local administration model such as that shown in FIG. 1, each server 10 has its own local network service management application 16. Through a local network service management application 16, the network administrator may administer the network services installed on the server where the network service management application is executing.

By way of example, the network administrator may employ local network service management application 16 at one of servers 10 to interact with the file service instantiations installed on that server in order to set individual users' access privileges for that server sharepoints, i.e., the volumes, folders, or files designated for sharing by the network users. The users' access privileges may then be saved to a database, to be consulted in the future by the file service to determine whether a particular user has sufficient access privileges to one of the server sharepoints.

FIG. 2 illustrates the remote administration model for a computer network. In FIG. 2, the same servers 10 and client terminals 14 are coupled to network bus 12 in a client-server architecture. However, the remote network service management application 38 now resides at an administrative console (AC) 18. Administrative console 18 represents the computer terminal or workstation through which the network administrator may remotely manage the network service instantiations installed on the servers 10 of FIG. 2. An administrative console 18 may have simultaneous logical sessions with more than one server 10 or more than one service instantiation. Through these logical sessions, the remote network service management application may view the configuration data related to the service instantiations on the network servers and, if appropriate, administer the network services installed thereon. The ability to remotely manage network services on servers that may be geographically dispersed from a centrally located administrative console is particularly advantageous for large networks and therefore represents an improvement over the local administration model of FIG. 1.

FIG. 3 illustrates an example of a prior art remote network service management application 38, such as that installed on administrative console 18 of FIG. 2, including a server manager window 40. Within server manager window 40, the network service instantiations, along with the corresponding network servers on which they execute and their statuses, are shown. In the example of FIG. 3, three e-mail service instantiations on servers AB, CD, and EF, as well as a file service instantiation, also on server AB, are shown.

In the prior art, remote network service management application 38 is programmed to specifically communicate with and administer the network service instantiations on a specific network. When the prior art remote network service management application 38 is executed at administrative console 18, it communicates with selected servers in the network to ascertain the statuses of the service instantiations installed thereon and report that data in window 40. To administer one of the services, the network administrator then selects one of the listed entries in window 40 for administration. If the e-mail service on server AB entry is selected for administration, for example, another window 42 may be launched. Window 42 would contain information regarding the e-mail service on server AB such as the number of users on line, the amount of disk space being used by this e-mail service, number of mail messages stored per user, and the like. Through window 42, the network administrator may then administer the e-mail service by changing the attributes or parameters as desired. Other services may also be administered in a similar manner.

Although the prior art approach to remote network administration represents an improvement over the local network administration model of FIG. 1, there are several disadvantages. By way of example, the prior art remote network service management application requires knowledge beforehand of the network services on the network servers. In order to recognize and administer the services in a network, the prior art remote network service management application is programmed upon installation for specific types of services, and a specific network protocol and configuration, and other network-specific as well as service-specific details. Knowledge of these network-specific and service-specific details is required by the prior art remote network service management application to allow it to communicate with a particular service instantiation on a particular network server.

If it is desired, subsequent to the installation of the prior art remote network service management application, to extend the types of network services available by, for example, installing a new network service on one of the network servers, it is typically necessary to reprogram the prior art remote network service management application to allow it to recognize and support the newly installed service. The reprogramming is necessary because when the prior art remote network service management application was created, it is programmed only for the types of network services available to the network at the time of its creation. The prior art remote network service management application would not know how to obtain status data and administer some novel network services that may be developed subsequent to the creation and installation of the prior art remote network service management application. Without this specific knowledge, the prior art remote network service management application cannot communicate with the newly installed network service instantiations to obtain status data and to administer them.

As can be appreciated, the need to reprogram the prior art remote network service management application to integrate new network services represents a burden for network administrators as well as for developers of the various network services.

In view of the foregoing, what is desired is an improved remote network administration apparatus and methods that can flexibly facilitate the extension of the types of network services available on a computer network. The inventive methods and apparatus preferably permit the improved remote network administration apparatus and methods to recognize and support the addition, deletion and/or update of network services on the network server without requiring its re-implementation.

SUMMARY OF THE INVENTION

The present invention relates, in one embodiment, to a remote network administration apparatus for managing network services on a plurality of network servers in a computer network. The apparatus includes a component repository, which contains service components. Each of the service components corresponds to one of the network services. The apparatus further includes at least one service object that is associated with a first one of the service components. The service object, when executed, communicates with the plurality of network servers to obtain network service instantiation data relating to instantiations of a first one of the network services on the plurality of network servers. The first one of the network services represents a network service that corresponds to the first one of the service components.

The apparatus further includes a server manager component for receiving the network service instantiation data from the service object. Additionally, there is included a server manager window, representing the user interface component for the server manager component. The server manager window functions to display a status of the instantiations responsive to the network service instantiation data.

In another embodiment, the invention relates to a method for managing network services on the plurality of network servers in a computer network. The method includes the step of providing at least one service component in a component repository. The service component corresponds to one of the network services. There is also included the step of providing a server manager component, which communicates with the component repository to ascertain the presence of the service component.

Additionally, the method includes the step of executing a service object associated with the service component. When executed, the service object communicates with the plurality of network servers to obtain network service instantiation data relating to instantiations of the one of the network services on the plurality of network servers. The method also includes the step of passing the network service instantiation data to a server manager window component for displaying a status of the instantiations responsive to the network service instantiation data.

These and other advantages of the present invention will become apparent upon reading the following detailed descriptions and studying the various figures of the drawings.

BRIEF DESCRIPTION OF THE DRAWINGS

Additional advantages of the invention will become apparent upon reading the following detailed description and drawings.

DETAILED DESCRIPTION OF THE INVENTION

Figure 1:
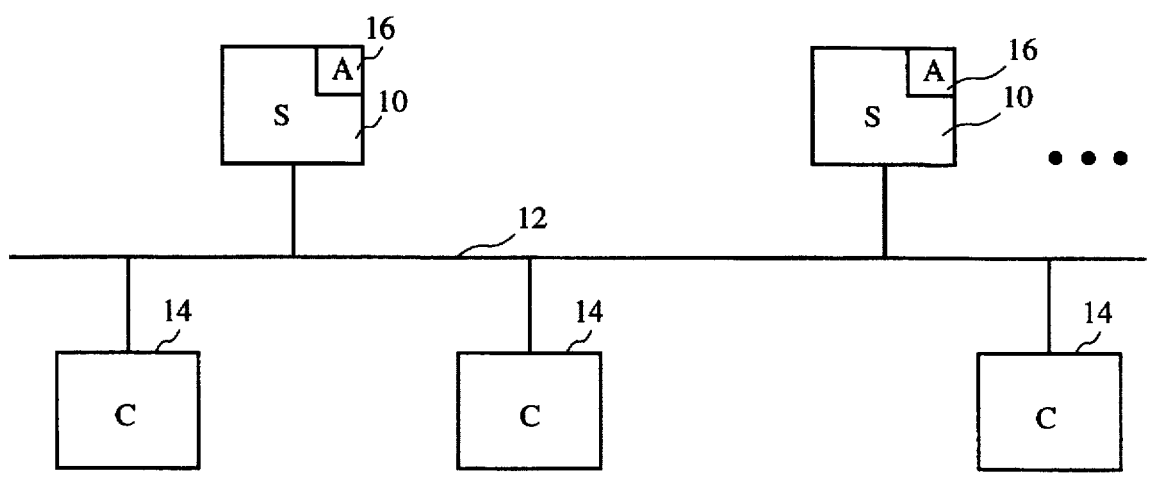
FIG. 1 illustrates an example of a computer network architecture commonly known as a client-server architecture, including prior art local administration facilities.
Figure 2:
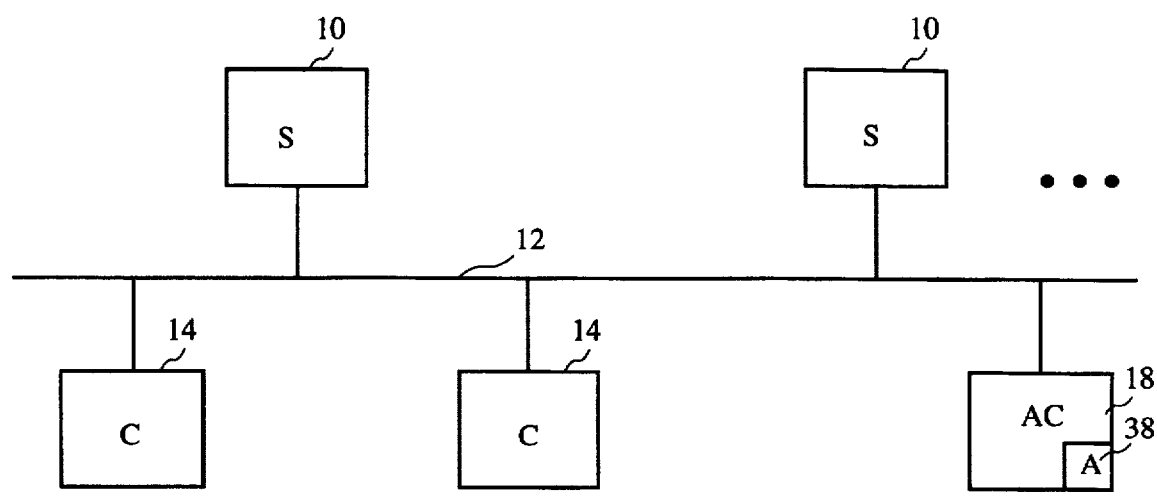
FIG. 2 illustrates the prior art remote administration model for a computer network.
Figure 3:
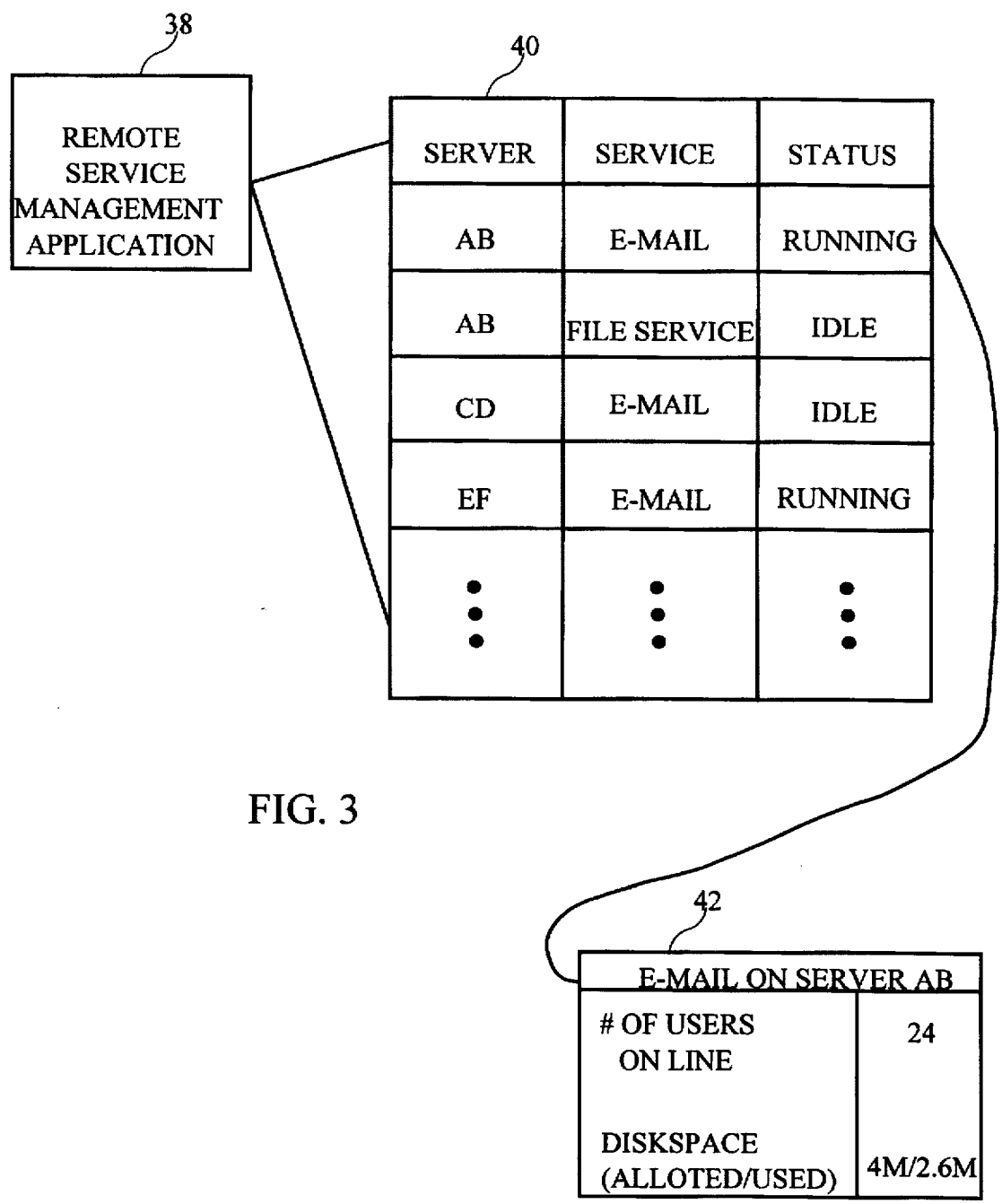
FIG. 3 illustrates a prior art remote network service management application.

As described above, FIG. 1 illustrates an example of a computer network architecture commonly known as a client-server architecture. FIG. 2 illustrates the prior art remote administration model for a computer network. FIG. 3 illustrates a prior art network service management application.

Figure 4:
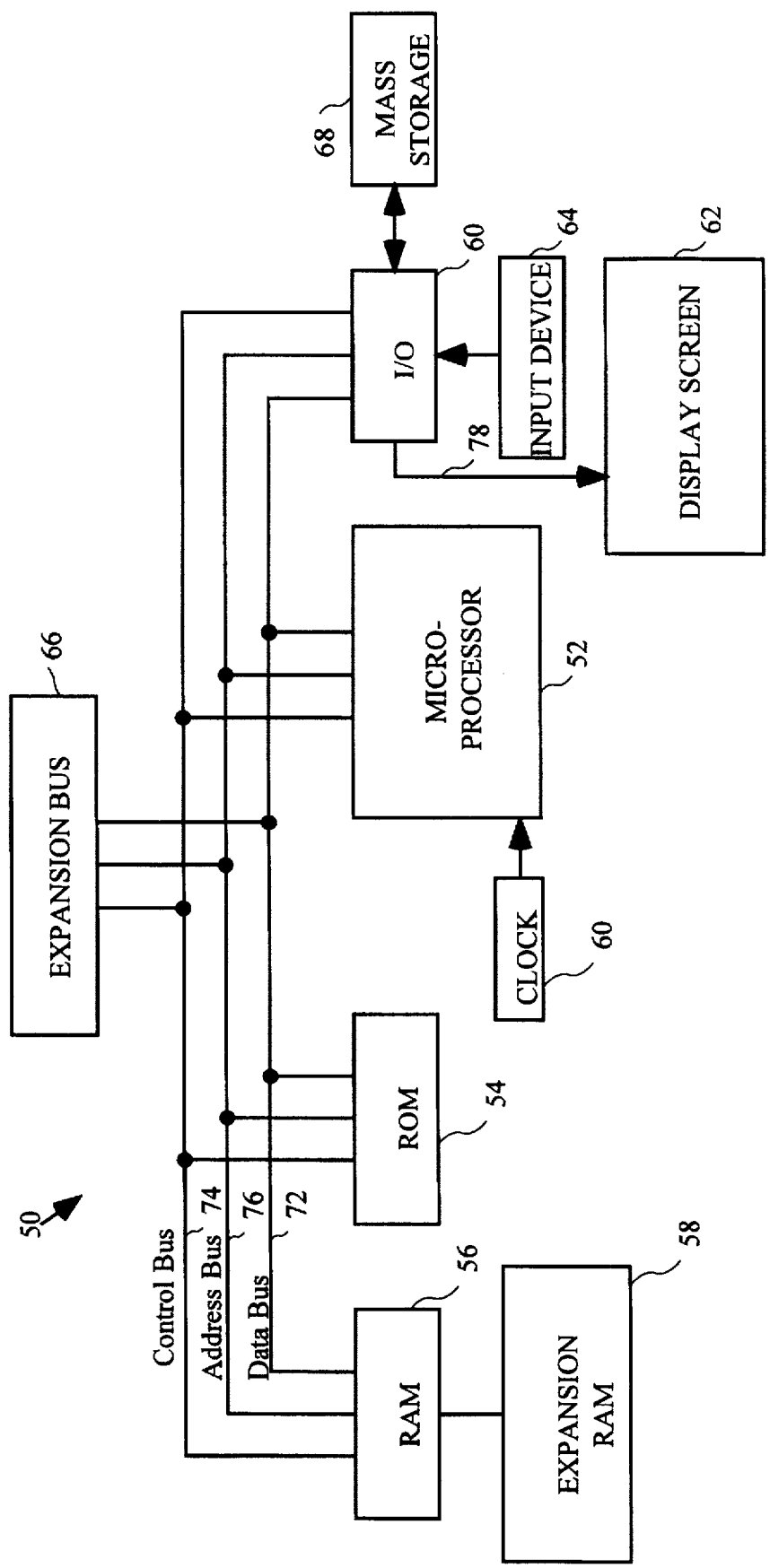
FIG. 4 shows a general purpose computer system for implementing the servers, client terminals, and administrative console of the present invention.

FIG. 4 shows a general purpose computer system for implementing the servers, client terminals, and administrative console of the present invention. Typically, servers in a given network are provided with more computing, network connectivity, and storage resources than either client terminals or administrative consoles although they may all be implemented using similar computer systems as hardware costs decrease. Referring now to Pig. 4, a computer system 50 in accordance with the present invention includes a central processing unit (CPU) 52, read only memory (ROM) 54, random access memory (RAM) 56, expansion RAM 58, input/output (I/O) circuitry 60, display assembly 62, input device 64, and expansion bus 66. Computer system 50 may also optionally include a mass storage unit 268 such as a disk drive unit or nonvolatile memory such as flash memory and a real-time clock 60. In one embodiment, mass storage unit 268 may include units which utilizes removable computer readable media, such as floppy disks, opto-magnetic media, optical media, and the like for the storage of programs and data.

CPU 52 is preferably a commercially available, single chip microprocessor such as one of the Sparc, Intel X86 or Motorola 680XX family of chips available from respectively Sun Microsystems, Inc. of Mountain View, Calif., Intel Corp. of Santa Clara, Calif., and Motorola, Inc. of Schaumburg, Ill. Preferably, CPU 52 is a reduced instruction set computer (RISC) chip such as the PowerPC™ microprocessor available from the aforementioned Motorola Inc. CPU 52 is coupled to ROM 54 by a data bus 72, control bus 74, and address bus 76. ROM 54 may partially contain the basic operating system for the computer system 50. CPU 52 is also connected to RAM 56 by busses 72, 74, and 76 to permit the use of RAM 56 as scratch pad memory. Expansion RAM 58 is optionally coupled to RAM 56 for use by CPU 52. CPU 52 is also coupled to the I/O circuitry 60 by data bus 72, control bus 74, and address bus 76 to permit data transfers with peripheral devices.

I/O circuitry 60 typically includes a number of latches, registers and direct memory access (DMA) controllers. The purpose of I/O circuitry 60 is to provide an interface between CPU 52 and such peripheral devices as display assembly 62, input device 64, and mass storage 268. Display assembly 62 of computer system 50 is an output device for displaying objects and other visual representations of data.

The screen for display assembly 62 can be a device that uses a cathode-ray tube (CRT), liquid crystal display (LCD), or the like, of the types commercially available from a variety of manufacturers. Input device 64 can be a keyboard, a mouse, a stylus working in cooperation with a position-sensing display, or the like. Alternatively, input device can be an embedded RF digitizer activated by an "active" RF stylus. Therefore, as used herein, the term input device will refer to any mechanism or device for entering data and/or pointing to a particular location on a screen of a computer display. The aforementioned input devices are available from a variety of vendors and are well known in the art.

Some type of mass storage 268 is generally considered desirable. However, mass storage 268 can be eliminated by providing a sufficient amount of RAM 56 and expansion RAM 58 to store user application programs and data. In that case, RAMs 56 and 58 can optionally be provided with a backup battery to prevent the loss of data even when computer system 50 is turned off. However, it is generally desirable to have some type of long term mass storage 268 such as a commercially available hard disk drive, nonvolatile memory such as flash memory, battery backed RAM, PC-data cards, or the like.

In operation, information is inputted into the computer system 50 by typing on a keyboard, manipulating a mouse or trackball, or "writing" on a tablet or on a position-sensing screen (not shown) associated with display assembly 62. CPU 52 then processes the data under control of an operating system and an application program stored in ROM 54 and/or RAM 56. CPU 52 then typically produces data which is outputted to the display assembly 62 to produce appropriate images on its screen.

Expansion bus 66 is coupled to data bus 72, control bus 74, and address bus 76. Expansion bus 66 provides extra ports to couple devices such as network interface circuits, modems, display switches, microphones, speakers, etc. to CPU 52. On some computers, the network interface circuit may be built in instead of being provided through expansion bus 66. Regardless, network communication is accomplished through the network interface circuit and an appropriate network.

Still further, the present invention relates to machine readable media on which are stored program instructions for performing operations on a computer. Such media includes by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

Figure 5A:
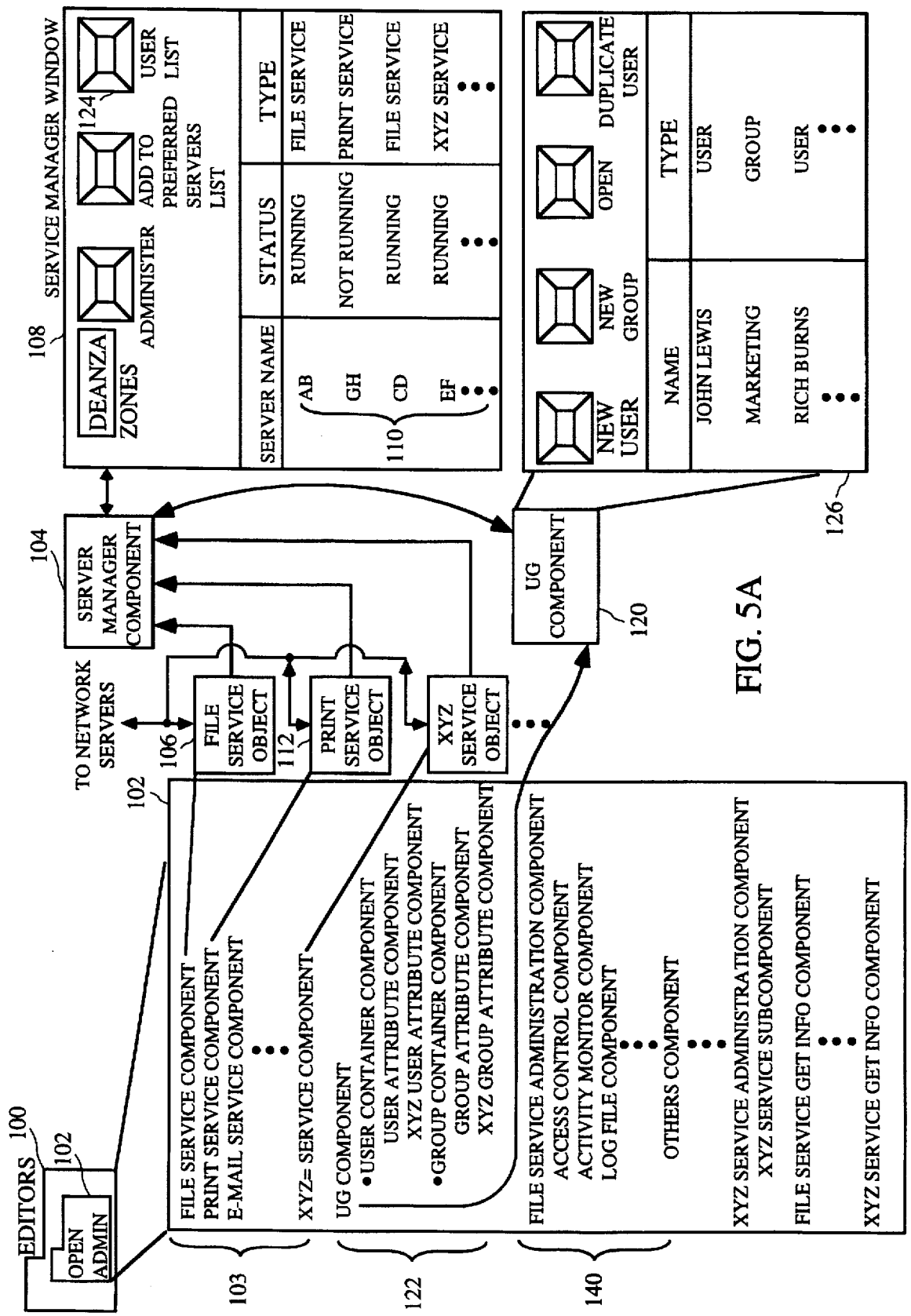
FIGS. 5A and 5B show, in accordance with one aspect of the present invention, the architecture of the improved remote network administration apparatus.

FIG. 5A shows, in accordance with one aspect of the present invention, the architecture of the improved remote network administration apparatus. There is shown a server manager component 104. As will be discussed in detail later, server manager component 104 represents the entity that interacts with other components, known as service objects, to gather data regarding the network service instantiations on the network servers. Server manager component 104 also has a corresponding window, shown in FIG. 5A as server manager window 108. Server manager window 108 is the window through which the human network administrator can view the instantiations of the various network service entities that are installed on the servers of the network. As the term is used herein, a service entity represents a network service, e.g., FileService, PrintService, E-MailService, and the like. Each service entity may in turn have more than one instantiations, or installed copies, on one or more of the network servers.

These instantiations of the network service entities, their respective statuses, and their corresponding server names are shown in window 108 as list 110. For example, there are shown two instantiations of the FileService entity on servers AB and CD, both of which are running. A PrintService instantiation exists on server GH, whose status is currently "Not Running." An XYZ service instantiation, representing yet another installed network service, is shown running on server EF.

Through the user interface of server manager window 108, the human network administrator may also initiate administrative actions regarding the network service instantiations listed in list 110. Depending on which network service is selected, server manager component 104 may then invoke, if possible, an appropriate component to handle the actual administration. In this manner, server manager window 108, through underlying server manager component 104, represents the single entry point through which remote administration of all network services on the network is initiated. Consequently, the invention allows network administrators to administer discrete network services from a central server manager window while providing them with a consistent, integrated user experience as if the administrator were operating within one unified software application. From this single entry point, network administrators can browse and select the services they wish to administer on the network as well as monitor these individual network services and servers from a common viewpoint.

In contrast, the prior art requires a network administrator to use multiple network service management applications to manage the different network services installed on the network servers. Each of these network service management application may be created by a different developer. Consequently, the different applications may lack the generality and common components that provide the human network administrator with an integrated user experience.

In accordance with the preferred embodiment, there exists a component repository, which may comprise one or more files residing either locally at the administrator's terminal or on the network for indicating the locations of the components. Each network service that is installed on the network servers has a corresponding service object registered with or contained within this component repository. For ease of illustration, subsequent discussions herein are made with reference to the Macintosh operating system (MacOS™), manufactured by Apple Computers, Inc. of Cupertino, Calif. and particularly to a component-based environment known as OpenDoc™, also available from Apple. For further information regarding component-based architectures and the aforementioned OpenDoc™ environment, reference may be made to, for example, commonly-assigned, pending patent application U.S. patent Ser. No. 08/175,549 entitled "Frame Structure Which Provides an Interface Between Parts of a Compound Document" which is hereby incorporated by reference.

It should be borne in mind, however, that the present invention is neither limited to the MacOS™, OpenDoc™, nor to any particular computer platform or network. The adaptation of the invention disclosed herein for other platforms and operating systems, e.g., the Intel-based platform popular known as the PC platform and its associated Windows-based operating system and Object Linking and Embedding (OLE) environment, available from the aforementioned Intel Corp. and Microsoft Corp. of Redmond, Wash. respectively, are well within the abilities of those skilled in the art given this disclosure.

For the MacOSlOpenDoc™ embodiment, the components exist within an Editors folder 100, which is installed on the administrative console. When OpenDoc is installed in the system, it automatically creates an "Editors" folder 100 inside of the system folder. When the system administrator runs the installation utility for the remote network administration apparatus, an OpenAdmin folder 102 gets created inside the "Editors" folder 100 and all the components related to the remote network administration apparatus are preferably copied into the OpenAdmin folder. It should be borne in mind that these specific steps are related to the MacOS/OpenDoc™ embodiment and variations thereof exist for other environments, as is apparent to those skilled in the art given this disclosure.

OpenAdmin folder 102 represents an implementation of the aforementioned component repository. By way of example, OpenAdmin folder 102 contains a plurality of service objects 103, each of which, as explained earlier, corresponds to a different network service entity. There is preferably only one service object for each installed network service entity, irrespective of how many instantiations there may be.

With reference to FIG. 5A, there is a FileService object which corresponds to a network FileService service entity, a PrintService object which corresponds to a network PrintService service entity, and an XYZ service object which corresponds to a network XYZ service entity. The service objects are typically obtained from network service developers, who supply network service packages to network administrators for inclusion in the network either along with server manager component 104 or at a time subsequent to the installation of server manager component 104.

Upon startup, server manager component 104 scans through the component repository, i.e., OpenAdmin folder 102 in the present embodiment, for the service objects. For each service object, server manager component 104 creates an associated instance of that service object. For example, when server manager component 104 encounters the FileService object in OpenAdmin folder 102, it creates an instance of that FileService object, shown as FileService object 106. FileService object 106 then communicates with the servers in the network to ascertain all instantiations of the FileService entity on the network. The network service instantiation data regarding FileService is then passed to server manager component 104 to be displayed in list 110 in server manager window 108.

An instance of a service object, such as FileService object 106, is preferably a system object module (SOM) and is therefore platform and language independent. There exist many references regarding system object modules, object-oriented programming, and component-software architectures, e.g., OpenDoc™, OLE, and the like, in the art. Discussions of these topics are therefore omitted for clarity. In general, a service object, such as FileService object 106, does not possess a user interface. As mentioned earlier, its main function is to obtain network service instantiation data from the computer network and return that data to the server manager component 104 to be displayed in server manager window 108.

In accordance with one aspect of the present invention, the low level network-specific and service-specific details such as configuration, communication protocol, what this service does, how this service works, and the like, that are required for communicating with the servers are preferably encapsulated within the service objects. This allows the service developers to utilize the protocol and network technology best suited to the requirements of their service.

In fact, the server manager component is not required to know how the network is configured, how many servers are coupled to the network, and what protocol is employed for network communication. Further, the server manager component is not required to know how a particular service functions and how to administer that service. The retrieval of network service instantiation data and, as will be shown later, the administration of those network services, are handled by other discrete components that advantageously encapsulate the low-level details away from the server manager component.

In this manner, the server manager component becomes essentially a messaging center for receiving network service instantiation data, displaying to the human network administrator that data, and passing administration commands and data related to one of the displayed network service instantiations from the human network administrator to other discrete components when the network administrator wishes to administer one of the displayed network service instantiations. Advantageously, the user interface is handled by the server manager window consistently, thereby presenting the service information in a consistent manner irrespective of the number or types of services on the network servers.

Furthermore, the server manager component of the present invention is not charged with the low-level, network-specific communication details and service-specific administration details but relies instead on the service objects to obtain its network service instantiation data and on the service administration components to manage the services. Consequently, the extension of the set of network services through the addition of a new network service (or the removal of a network service from one of the network servers) therefore does not require the re-architecturing and the re-implementation of the server manager component. Concomitantly, the cost of ownership and maintenance of a network is advantageously reduced.

In one embodiment, the service object can be developed simply as a shared library. The service object, when invoked by the server manager component, receives from the shared library pointers to a specific memory area where the service object can write to. The service object itself preferably possesses sufficient information to allow it to obtain network service instantiation data and status from the network servers. The network service instantiation data and status, once obtained by the service object, are then written into the aforementioned memory area for access by the server manager component. To illustrate, an example of a service object is furnished herein as Appendix A.

Further, the service object represents the central structure through which information related to other components for the associated service can be centralized. By way of example, a service object typically includes information regarding whether a given service has associated with it an administration component or a user/group component. This information may then be used by the server manager component in the administration of that service.

Similarly, server manager component 104 will create a PrintService object 112 upon ascertaining that OpenAdmin folder 102 contains a PrintService component. PrintService object 112 then interacts with the servers on the network to find out all instantiations of the PrintService entity on the network servers. In this example, there exists only one instantiation of the PrintService entity on server GH. This network service instantiation data, along with the status information, e.g., "Not Running" in the present example, is then displayed by server manager component 104 in server manager window 108.

There is further shown a User/Group (U/G) component 120, representing the component that manages the accounts of individual users and groups on a particular server of the network. U/G component 120, which is typically installed at the administrative console, is invoked when the network administrator selects one of the servers in list 110 (in server manager window 108) and indicates his or her desire to administer the users and/or groups on that server.

In one embodiment, the selection of a server for user/group administration is accomplished when the network administrator selects a server in list 110 and invokes the user/group component by selecting the user list button 124 or performing a similarly suitable user interface action. Server manager component 104, which is associated with the server manager window 108, will then pass the address of the server selected to U/G component 120 to allow U/G component 120 to administer the users and/or groups on the selected server.

In the preferred embodiment, the interaction between the human network administrator and U/G component 120 is preferably accomplished through a U/G manager window 126, which corresponds to U/G component 120 in this specific example. To illustrate, when the network administrator selects server AB in the list of network service instantiations that reads "AB/running/FileService" and selects user list button 124 in server manager window 108, the server address AB will be passed from server manager component 104 to U/G component 120. U/G component 120 then communicates with the selected server, i.e., AB in this example, to obtain the list of users and groups that are registered with server AB. Through U/G manager window 126, the network administrator may then create new users and groups as well as edit or delete existing users or groups and their attributes.

The U/G manager window 126 itself is preferably an OpenDoc component which is capable of invoking user or group OpenDoc containers for modifying respectively user attributes and group attributes. Containers are components that contain other components. Examples of user attributes include authentication data and access data for login verification, group membership data specifying the group(s) to which a particular user belongs, and any other miscellaneous attributes such as title, comments, and the like. Group attributes include, among others, its membership list.

Figures 1, 5B:
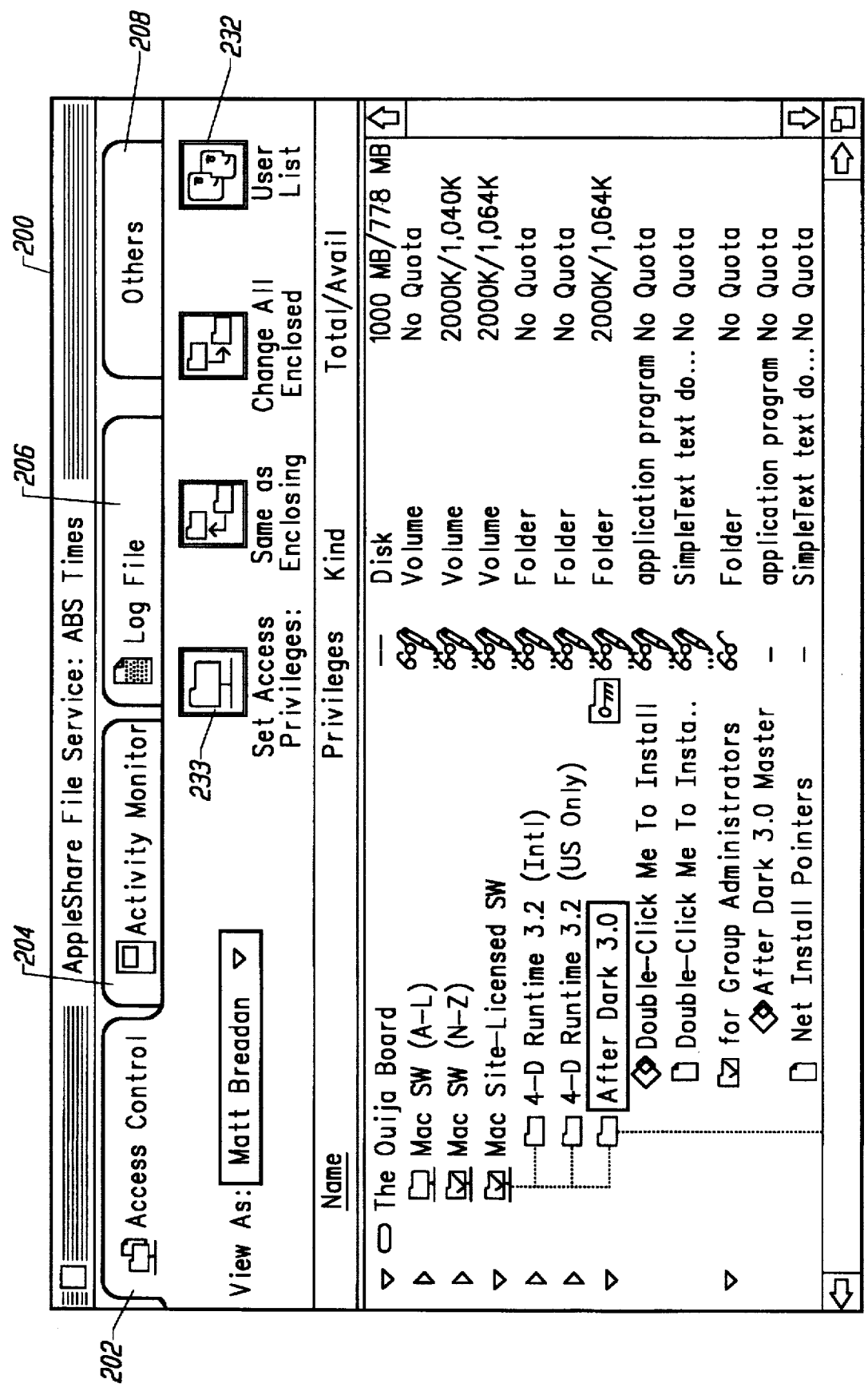
Figures 2, 5B:
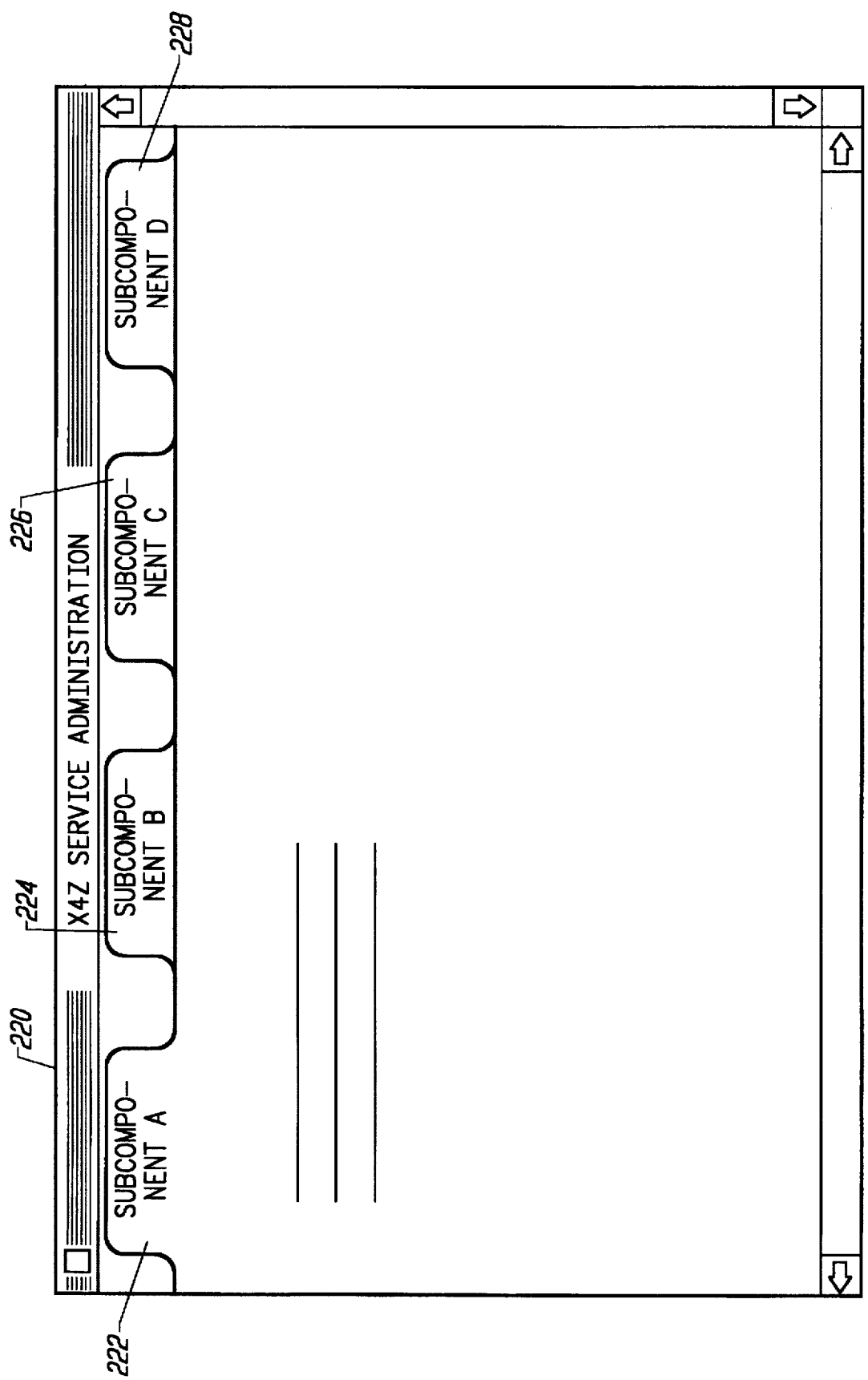
Figure 5C:
FIG. 5C illustrates an example of a user container component window.
Figure 5D:
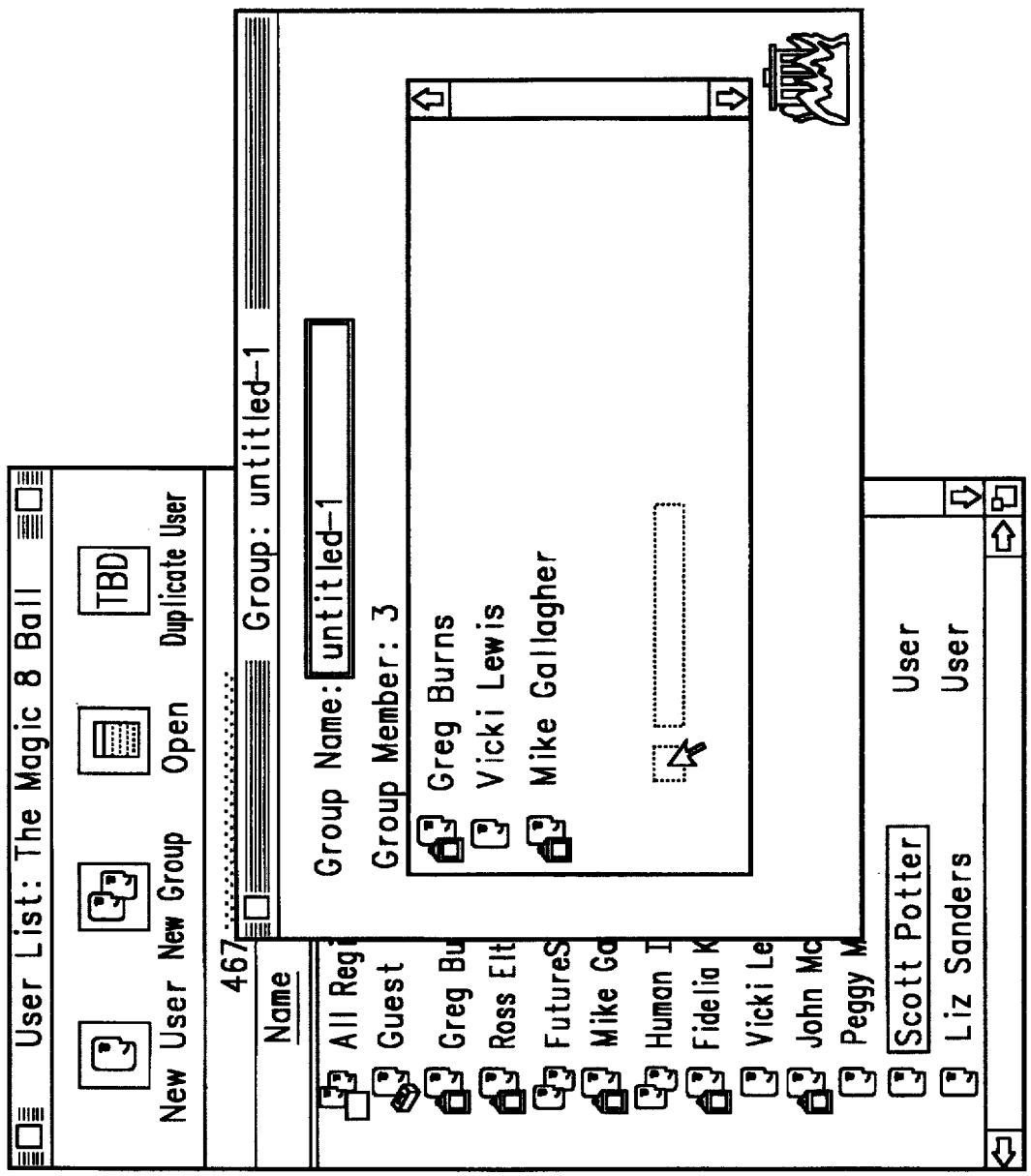
FIG. 5D illustrates an example of a group container component window.

To launch a user container component, the network administrator selects one of the users in the list of users displayed in U/G manager window 126, e.g., John Lewis, and indicate his or her desire to administer the attributes of that user. In the preferred embodiment, the administration of user attributes commences once the network administrator double-clicks on a particular user name or performs a similarly suitable user interface action to launch a user container component. Through a window associated with the user container component, the aforementioned user attributes, among others, may then be modified. An example of a user container component window is shown in FIG. 5C. Group attributes may also be administered in a similar manner. An example of a group container component window is illustrated in FIG. 5D.

Note that the attributes of a user or group may be dynamically modified even after the installation of the core OpenAdmin system. This feature is particularly advantageous in permitting the human network administrator to add user and group attributes to satisfy the needs of a subsequently acquired and installed network service. This is because not all user and group attributes may be provided at the time the core OpenAdmin system is installed.

By way of example, a subsequently developed E-MailService may need to identify the mailbox location for a particular user. Thus, the E-MailService developer would implement a user attribute component for specifying the mailbox location. At the time the E-MailService is installed, this user attribute component would be installed into the OpenAdmin folder. When the OpenAdmin system is launched, this new user attribute component would become part of the dynamic list of user attributes that are modifiable by the human network administrator. In the example of FIG. 5C, the different user attributes are accessible through pop-up menus 1202.

With reference back to FIG. 5A, U/G component 120 includes a user component and a group component. The user component, which is a container, includes user attribute components. The group component, which is a container, includes group attribute components. U/G component 120 is preferably stored in OpenAdmin folder 102 and shown in section 122 of OpenAdmin window 102. However, it preferably has different signatures than the service objects 103 to allow server manager component 104 to differentiate between it and the service objects 103 in OpenAdmin folder 102.

A network service may either be capable of being administered, i.e., its status and attributes can be modified, or represent one for which no administration is permitted. As an example of the latter, some network services may simply display static, unchangeable data regarding the service for viewing by the human network administrator. If a service is capable of being administered, a service administration component is provided in OpenAdmin folder 102. The service administration component represents the component responsible for communicating the human network administrator requests to the associated network service installed on the server machine. In one embodiment, these administration components have an identifier, e.g., a file type, that identifies them as OpenAdmin components generally, i.e., components of the improved remote network administration apparatus. Additionally, they also have other signatures to distinguish them from other OpenAdmin components such as the service objects 103 or the user and group attribute components.

By way of example, FIG. 5A shows a FileService component within section 103 of OpenAdmin folder 102. Since FileService represents a network service that is capable of being administered, OpenAdmin folder 102 also includes a FileService administration component in section 140 of OpenAdmin folder 102. When invoked, FileService administration component 140 creates a user interface, typically in a window, through which FileService-related data can be displayed and administration commands related to FileService can be invoked by the network administrator. This window is shown in FIG. 5B as FileService administration window 200.

In the preferred embodiment, the FileService administration window 200 is a container that contains other subcomponents for administering aspects of FileService. These are shown as access control window 202, activity monitor window 204, log file window 206, and "other" window 208. In the specific embodiment of FIG. 5B, these windows are implemented as folder tabs within FileService administration window 200 for usability reasons. To access one of the windows 202–208, the network administrator merely selects one of the tabs in FileService administration window 200.

The function of the access control component 202 of the FileService container is to display and assign access privilege to a selected user or a group. Through access control component 202, the network administrator is able to view the access privilege of a selected user with respect to the sharepoints, i.e., the shared volumes, folders and files, on a designated server. This feature greatly simplifies the FileService administration task and is further discussed in a co-pending patent application entitled "Improved File Service Administration Apparatus and Methods," (Attorney's Docket No. P1829/APL1P164), filed on Nov. 3, 1995, assigned to the same assignee Apple Computer, Inc., and incorporated herein by reference.

The network administrator can also set, through access control component 202, the maximum disk space assigned to a particular shared volume or folder, and review data regarding the amount of disk space remaining to be utilized by that particular folder.

Activity monitor component 204 of the FileService component represents a component for showing the run-time activity data for a designated server. Log file component 206 allows the network administrator to view events that have previously occurred on a designated server. An optional "other" component 208 represents a place holder, which can be plugged into by a third party developer or a subsequently released component that can be used to administer FileService installed on the server machine. Examples of such component include, for example, an alarm notification component to contact the network administrator via, e.g., e-mail, pager services, and the like, when an event requiring network administrator intervention is encountered on the file server machine as well as other functionalities that extend the management capabilities for the file server.

FIG. 5B also shows an XYZ service administration window 220. In this example, XYZ service administration window 220 is associated with an XYZ service administration component that is installed following the installation of server manager component 104 to implement a desired network service. XYZ service administration window 220 may either be a flat component or a container, i.e., one that possesses subcomponents such as those shown as subcomponents 222, 224, 226, and 228 in FIG. 5B. Because the XYZ service object itself (as well as its associated administration component and subcomponents, if any) is listed in OpenAdmin folder 102, XYZ service instantiations on the network servers are ascertained (by invoking an XYZ service object) and displayed in the server manager window 108 every time server manager component 104 is launched.

When the network administrator selects the XYZ service instantiation entry in the list of network services 110 in FIG. 5A and indicates his or her desire to administer the selected service instantiation, the server address associated with the selected XYZ service instantiation is passed to the XYZ service component. The XYZ service component then creates XYZ service administration window 220 for allowing the network administrator to administer the XYZ service instantiation selected.

Access control to a network service on a given server may be administered by appropriately adding or deleting a user's or group's name from that service's administration component window. By way of example, FIG. 5B shows an access control component window 250 associated with FileService administration component window 200 for controlling access to one of the sharepoints. As the term is used herein, a "sharepoint" denotes a folder or a volume that has been designated for sharing by selected network users. Access control list window 250 is invoked when the network administrator selects a sharepoint, e.g., "After Dark 3.0" folder in this example, and indicates his or her desire to administer the access control list, e.g., by selecting Set Access Privileges Button 233.

After access control list window 250 is invoked, the network administrator may then add a user's or group's name as well as specify the type of access granted, i.e., whether the granted access has any associated limitations or restrictions. The addition of a user's or group's name may be accomplished by simply typing in the name or choosing one from the list of users and groups registered with the network server on which that service instantiation resides. Such a list is shown in user/group component 254 of FIG. 5B, which may be invoked by, for example, selecting User List button 232 in the FileService Administration window 200. In the preferred embodiment, the system administrator may add a name to access control component 250 by, as shown in FIG. 5B, simply dragging it from user/group component 254 to access control component 250. A name may be deleted by dragging it out of access control list window 250.

It should be borne in mind that although only the FileService administration component and the XYZ service administration component are illustrated in FIG. 5B, other network services and associated administration components can also be implemented analogously. As mentioned, such network services include, for example, PrintService and E-MailService, as well as any other kinds of services for use in a network. The specific kinds of network services and their user interface details are not critical. In accordance with the invention, all the network services, whether installed at the same time with the server manager component or subsequent to it to extend network services, can be recognized and supported by the improved remote server manager component when the improved remote server manager component is launched, i.e., started on the administrative console.

Figure 6A:
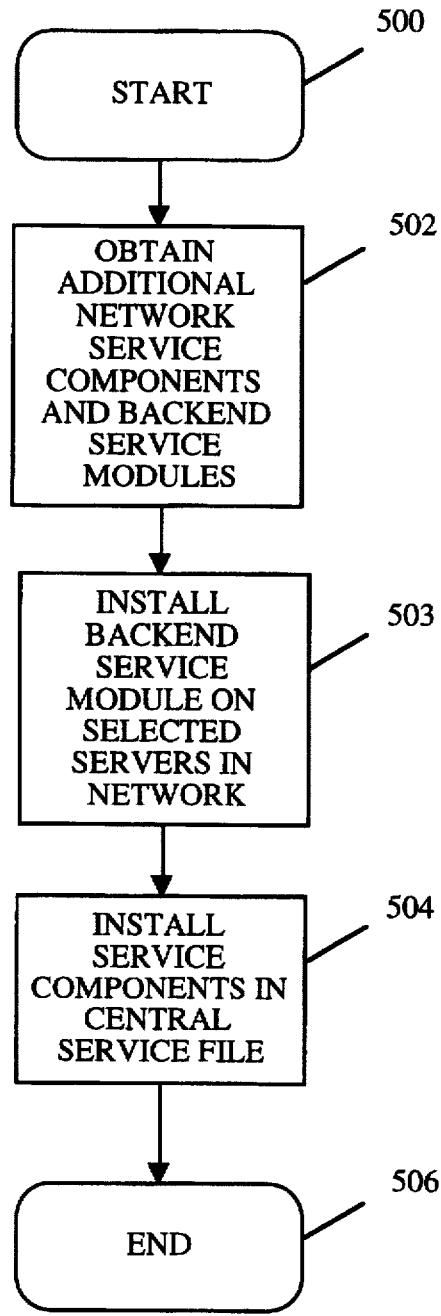
FIG. 6A illustrates, in accordance with one embodiment of the present invention, the steps involved in installing a new service in a computer network that already has the core improved remote network administration apparatus installed.

In accordance with one embodiment of the present invention, FIG. 6A illustrates the steps involved in installing a new service in a computer network that already has the core improved remote network administration apparatus installed. As mentioned earlier herein, the new service, following installation, can be recognized and administered through existing server manager component 104 and its associated server manager window 108 without requiring the re-configuration, re-implementation, or reprogramming of server manager component 104.

FIG. 6A starts at step 500. In step 502, the additional or updated service components and its associated backend service entity are obtained. The backend service entity represents the software entity that is installed on one or more servers in the network to actually perform the desired network service, e.g., FileService, PrintService, E-MailService, and the like. The service components represent the components to be placed in the component repository, e.g., OpenAdmin folder 102 in the specific embodiment, to be recognized by the server manager component 104. The service components also include a service object which, as mentioned earlier, is preferably a system object module (SOM) object. When invoked, the service object associated with a network service entity communicates with the network servers to obtain network service instantiation data for the instantiations of the corresponding network service entity. The network service instantiation data is then communicated to server manager component 104 to be displayed and administered through server manager window 108.

In one embodiment, the set of service components may also include an optional service getinfo component, representing a component that may be executed from server manager window 108 to obtain certain selective information about a selected network service instantiation. By way of example, when a particular FileService instantiation is selected for the getinfo operation, the getinfo component, when invoked, causes a window to be created to display a snapshot of the current status of the FileService on the server being selected. Such snapshot data for the selected FileService instantiation may include, e.g., how many users are currently logged in, how many files are open on the server at the time, the utilization rate, and the like. Note that the information provided by the getinfo component is service-specific and the data furnished by it vary depending on which service is selected for getinfo operation in network service manager window component 108.

Further, the set of service components may also include an optional U/G (user/group) browser, representing the component that may be invoked from the server manager window 108 to manage the users, groups, and their attributes for this particular network service. In one embodiment, the PrintService, FileService, and E-MailService all utilize the same U/G browser for managing their users and groups. However, it is contemplated that a service may be provided with its own U/G browser in some other embodiments.

If the network service has parameters that can be modified by the network administrator or is capable of being controlled through the remote network administration apparatus (in contrast to services that merely obtain and display data for the network administrator's viewing), the set of service components preferably includes a service administration component, representing the component for implementing the user interface that facilitate communication between that service and the network administrator.

After the additional or updated service components and its associated backend service entity are obtained in step 502, the backend service entity is installed on one or more selected servers in the computer network in step 503. Typically, each instantiation of the backend service entity is installed at the site of the selected server(s). However it is possible to remotely install these backend service instantiations directly from the network administrative console in some networks.

In block 504, the service components obtained in block 502 are installed in the component repository, e.g., OpenAdmin folder, on the network administrative console. As discussed earlier, this OpenAdmin folder is, in the MacOS/OpenDoc embodiment, part of the Editors folder on the administrative console. From block 504, the method ends at block 506.

Figure 6B:
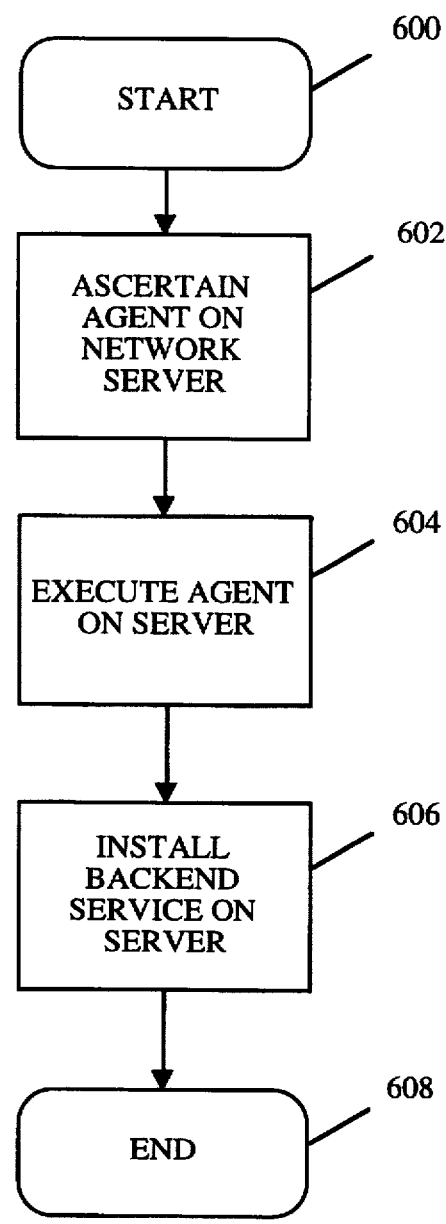
FIG. 6B illustrates, in one embodiment, the additional steps involved in handling the agents to accomplish the installation of the backend service entities on the network servers.

In step 503 of FIG. 6A, it is assumed that there are no remote management agents on the servers of the network. If one or more servers in a network have agents executed thereon, FIG. 6B illustrates, in one embodiment, the additional steps involved in handling the agents to accomplish step 503 of FIG. 6A (installation of the backend service entities on the servers).

Remote management agents are an optional feature on some servers. On a given server, an agent performs the central management functions that each service separately would have to perform and centralizes the data obtained from performing those central management functions in one area on that server for ready access. By supporting agents, the individual services on a network server do not have to perform these management functions themselves.

In one embodiment, agents are used to manage the users/groups databases that exist on the servers. The agent performs all the necessary management of that database and downloads the database to the administrative console upon request. An agent may also provide a service registry that allows all services to register through an Application Programming Interface (API). An agent installed on a server will have knowledge of all the services installed on that server. The service objects may utilize a client-side API for obtaining instantiations of those services as registered in the service registry.

Further, an agent may provide a logging interface. All the service instantiations that run on a server, e.g., FileService, PrintService, E-MailService, XYZ service, and the like, may open and write to the agent log file (through a set of API). To facilitate the viewing of the entries of this log file, the administration console may employ a client-side API to talk to the agents to obtain the log entries for a particular service on that server.

FIG. 6B starts at block 600. In block 602, the agent on the servers is ascertained. If there is no agent and the new service requires an agent, the new agent may be installed in block 602 on the server where installation of the backend service entity is to take place. If there already exists an agent, this existing agent is ascertained in block 602. In block 604, the agent is executed on the server. In block 606, the backend service entity is then installed on the desired server to create an instantiation. In some embodiments, the server may have to be restarted to enable the agent to ascertain data regarding the newly installed backend service instantiation. When the service is executed at the server, it will then invoke a service registration API (Application Programming Interface) to communicate to the agent about its existence, its status, and other parameters. The steps of FIG. 6B end at block 608.

Figure 7:
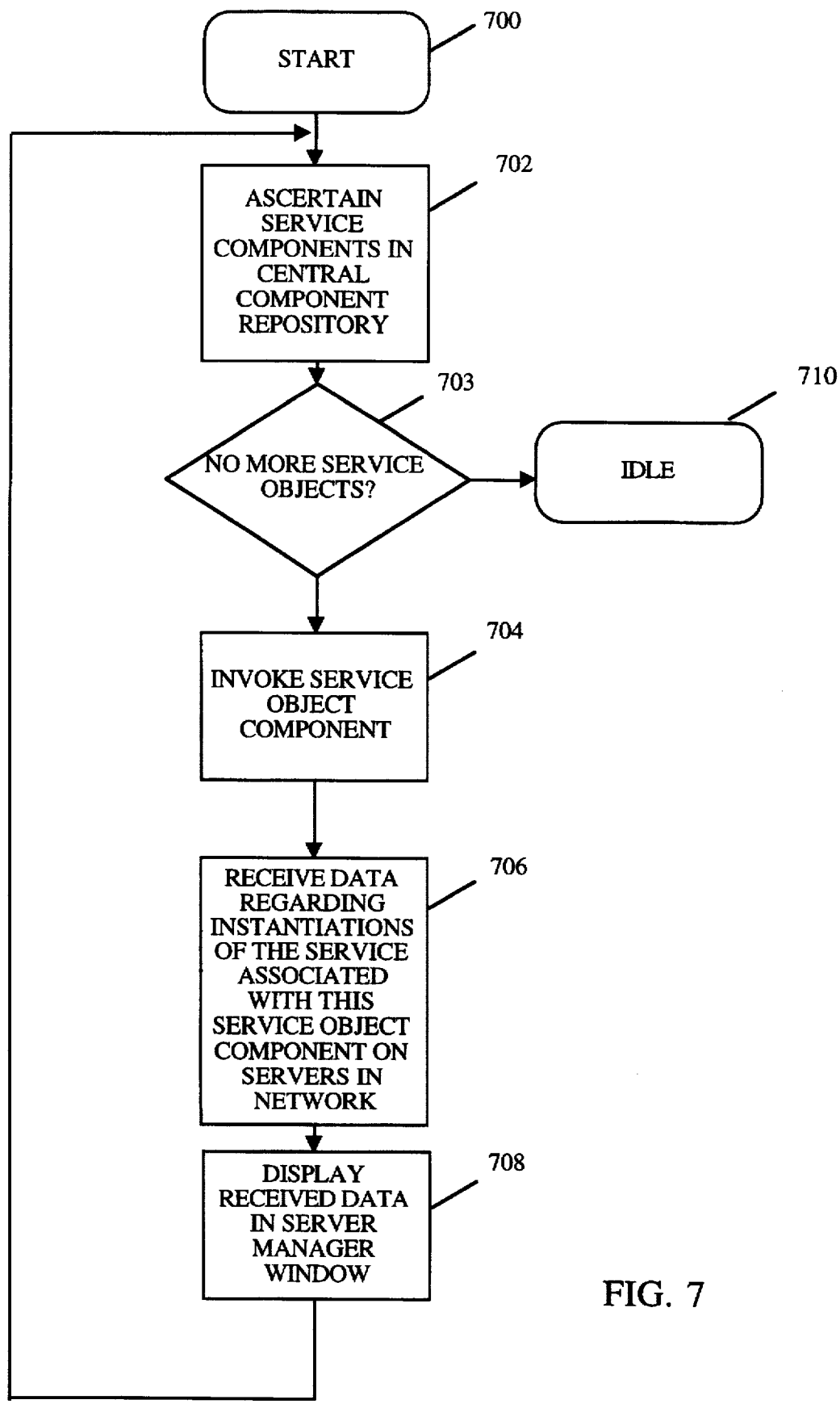
FIG. 7 shows, in one embodiment, the steps involved in receiving data regarding instantiations of a service on the servers of the network.

Following the installation of a network service's components on the administrative console, the server manager component can then utilize the service object associated with the installed service component to communicate with the network servers and receive data regarding instantiations of that network service entity on the servers of the network. FIG. 7 shows, in one embodiment, the steps involved in receiving data regarding instantiations of a service on the servers of the network. FIG. 7 starts at block 700. In block 702, the service components in the component repository, e.g., in the OpenAdmin folder 102 of the present embodiment, are ascertained.

The service components in OpenAdmin folder 102 are preferably ascertained sequentially. As long as there remains a service component in OpenAdmin folder 702, (as determined in block 703), the method continues to proceed to block 704 wherein the server manager component invokes the service object that is associated with that service component. In block 706, the service object communicates over the network using a protocol appropriate to the network service entity (the protocol-specific communication details are encapsulated in the service object).

The service object then ascertains from the servers on the network all the instantiations of the service entity that is associated with that service component. Note that the low level network-specific and service-specific details necessary to obtain network service instantiation data related to a particular network service is advantageously encapsulated in the service object. Consequently, it is not necessary for the server manager component to have prior knowledge of what type of network service it is managing, how the network is configured, how many servers are coupled to the network, or even how the network service instantiation data is obtained. Because of this, any network service having an appropriate service object can be integrated into the existing network management component framework to permit the network administrator to manage it along with all the other network services as if he were working within a single monolithic application.

In block 706, the network service instantiation data regarding the instantiations on the network servers of the service associated with this service object is received by the server manager component. In block 708, the data received in block 706 is displayed in the server manager window component, e.g., server manager window component 108 of FIG. 5A. If there are additional service object component in the component repository, the method then returns to block 702 to ascertain the next service object component. Otherwise, the steps of FIG. 7 end at block 710 where the process of FIG. 7 is idle (other processes may still be executing).

Figure 8:
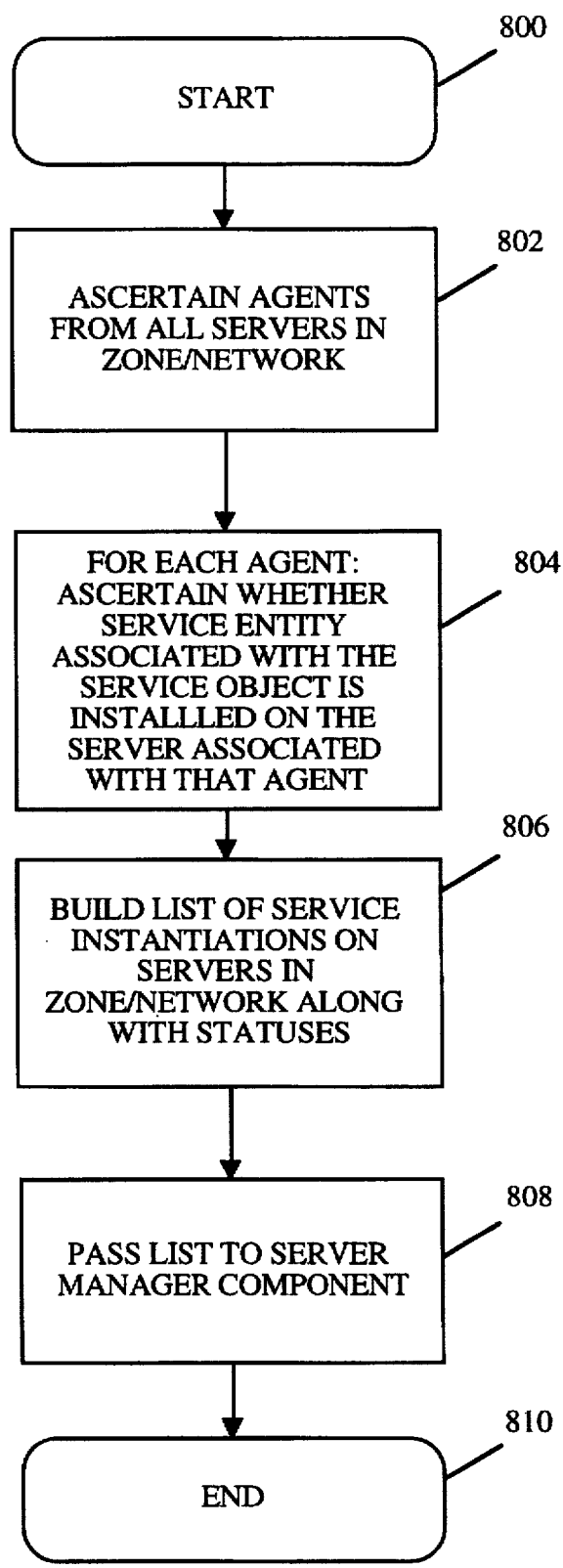
FIG. 8 shows, in accordance with one embodiment, the steps taken by the service object in interacting with the agents on the servers of the network to obtain the network service instantiation data.

If there exist agents on the network servers, it may be necessary for the service objects to interact with the agents to obtain information regarding the instantiations of the service associated with this service object. FIG. 8 shows, in accordance with one embodiment, the steps taken by the service object in interacting with the agents on the servers of the network to obtain such network service instantiation data.

FIG. 8 starts at block 800. In block 802, agents from all the servers in the relevant network/zone are ascertained. In some networks, a zone may be defined as the entire network. On other networks, a zone may represent a specific domain comprising a predefined group of servers and client terminals in a network. The division of a network into zones facilitate management if the network is large. For the purpose of the present disclosure, the term zone and network may be used interchangeably.

In block 802, the agents may be ascertained by simply polling the servers for their agents or by broadcasting to all servers over the network and asking the servers to respond with its address if that server contains the agent of interest. By way of example, the broadcast mechanism may be employed in networks that utilize the above-mentioned AppleTalk™ protocol. Alternatively, some networks, e.g., those implementing TCP/IP (Transmission Control Protocol/Internet Protocol), may have a server designated to keep the data relating to location of the agents in the network. In this case, step 802 involves interacting with that designated server to obtain the agent data.

For each agent ascertained in block 802, the method proceeds to block 804 to ascertain whether, for the service object being invoked in block 704, there is an instantiation of the corresponding service entity installed on the server. If there are many instantiations of that service on the server, that data is also ascertained in block 804. In block 806, a list of service instantiations residing on the servers in the zone/network of interest, along with the statuses of the services, is compiled by the service object through the use of the service registry browsing API.

The statuses of the service instantiations are preferably ascertained also through the agent. Examples of such statuses include executing (running), stopping, terminating, idle, technical difficulties of various kinds, and the like. Alternatively, the service object may use the ascertained server addresses of the servers on which the relevant service instantiations are installed (the server addresses are ascertained in block 804) to establish a session with those servers to ascertain the statuses directly from the servers.

In block 808, the list that was compiled in block 806 is passed to the server manager component to be displayed in the server manager window component. The steps of FIG. 8 end at block 810.

Figure 9:
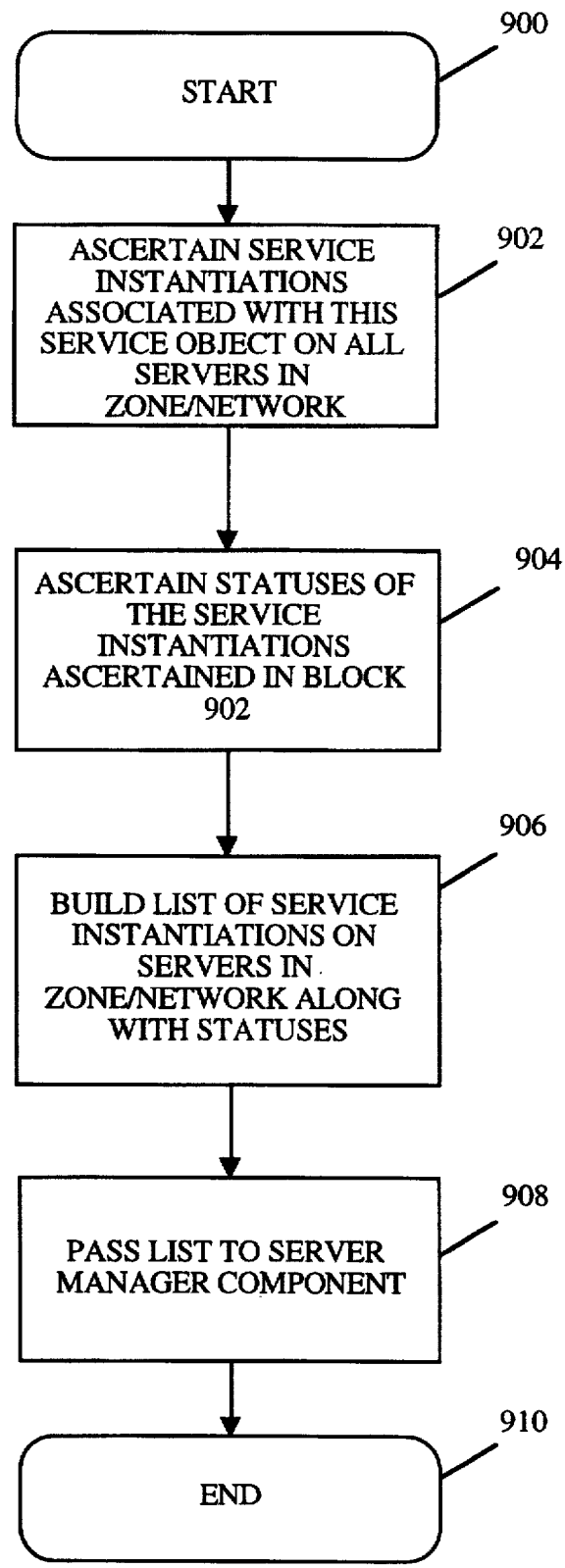
FIG. 9 describes the steps taken, in one embodiment, by the service object in obtaining the network service instantiation data without agent's involvement.

If the service object does not require the use of agents to ascertain the network service instantiation data, FIG. 9 describes the steps taken, in one embodiment, by the service object in obtaining that data without agent's involvement. FIG. 9 starts at block 900. In block 902, the service instantiations associated with the invoked service object on all the servers in the zone/network of interest are ascertained. Again, the service instantiations may be ascertained either by broadcasting to all servers in the zone/network of interest, e.g., the case wherein the protocol is AppleTalk™. The network servers on which there is an instantiation of that service entity will then return its address to the service object.

Alternatively, the service object may inquire from a designated server, e.g., a directory service, in the network to ascertain which servers on the network have one or more instantiations of the service entity of interest installed thereon.

In block 904, the statuses of the service instantiations ascertained in block 902 are determined. These statuses represent the service specific run-time statuses of the services and may include such statuses as running, terminating, and the like. In block 906, the list of service instantiations residing on the servers in the zone/network along with the statuses of those service instantiations are built. In block 908, the list created in block 906 is passed to the server manager component to be displayed in the server manager window. The steps of FIG. 9 end at block 910.

Figure 10:
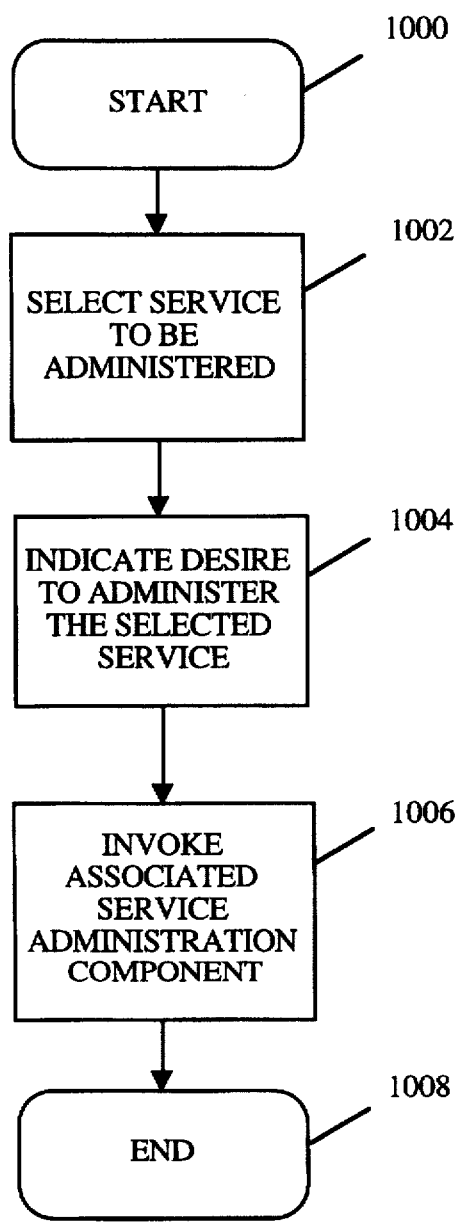
FIG. 10 shows from the server manager component perspective the steps involved, in one embodiment of the invention, in administering a network service from the server manager window.

FIG. 10 shows from the server manager component perspective the steps involved, in one embodiment of the invention, in administering a network service from the server manager window. FIG. 10 starts at block 1000. In block 1002, the network administrator selects the service instantiation to be administered using a suitable user interface command from the server manager window. In one embodiment, the selection of the service instantiation to be administered is performed by highlighting a service instantiation entry in the list of network services 110.

In block 1004, the network administrator indicates the desire to administer the service selected in block 1002. Depending on the user interface design, the indication step of block 1004 may be accomplished, in one embodiment, by selecting an "administer" button. However, the network administrator may alternatively indicate the desire to administer the selected service through a pop-up menu, typing in keys on a keyboard, selecting an item from a menu, and the like. Note that if there is no service administration component associated with a selected service, there would be no component to facilitate the administration of the service. In this case, a warning is preferably sent to the network administrator to indicate that the service selected in block 1002 cannot be administered through this apparatus. Alternatively, the above U/I elements may be disabled to prevent selection when no service administration component is provided.

In block 1006, the service administration component associated with the service instantiation selected in block 1002 is invoked. Upon being invoked, the service administration component will employ the server address that is associated with the service instantiation selected in block 1002 to establish a logical network session with the appropriate service instantiation on the backend server (the server where the service instantiation resides). If the session is established successfully, the window of this service administration component is then invoked. Through this service administration window, the service can then be administered, e.g., by changing parameters or attributes in the service administration window. If, however, the session cannot be established successfully, the service administration component may post an error message in lieu of opening its associated service administration window.

In one embodiment, if the service instantiation indicated in block 1002 is not yet launched, i.e., executed, on a given backend server, the network administrator may be asked whether he or she desires to launch the service instantiation on this backend server prior to administering. The launching of the service itself may then be performed under the direction of the service administration component (through an agent if the agent is involved in launching the service instantiation).

Figure 11:
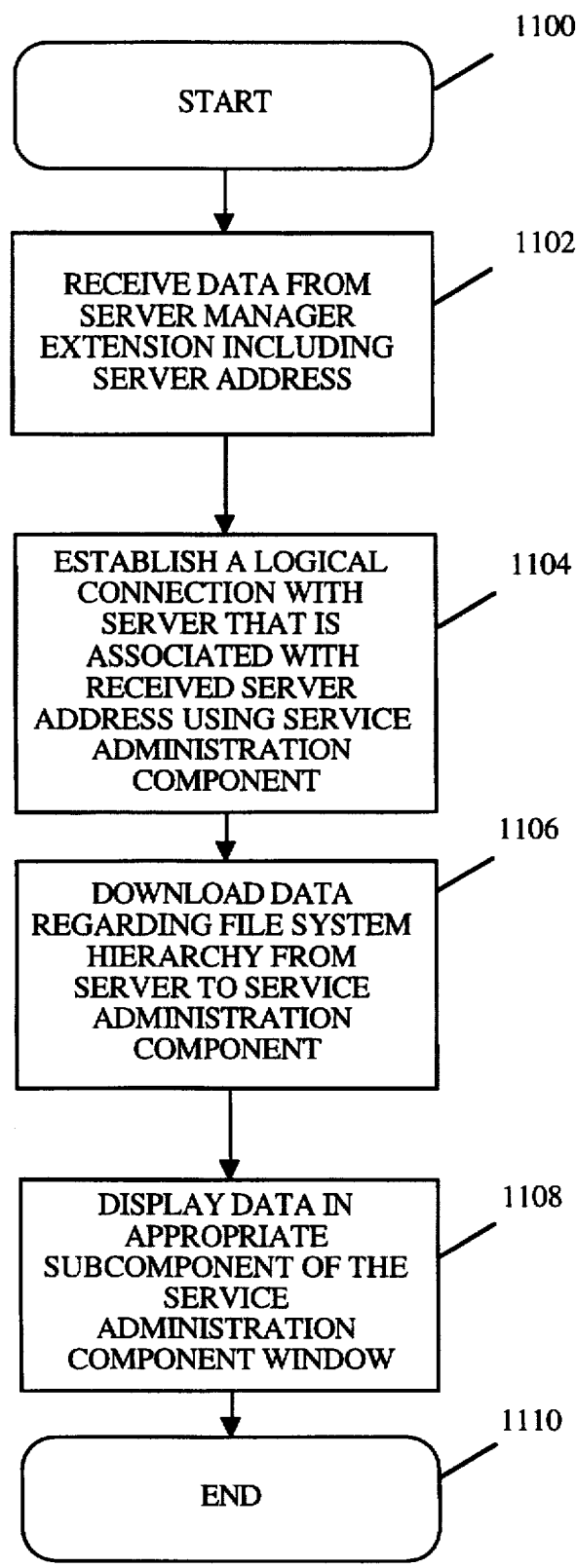
FIG. 11 illustrates, in one embodiment of the present invention, the steps involved when a service administration component is invoked through the server manager window component.

FIG. 11 illustrates, in one embodiment of the present invention, the steps involved when a service administration component is invoked through the server manager window component. To facilitate understanding, the FileService network service is chosen as an example although the method herein, with modifications familiar to those skilled in the art, may well apply to any other network service. In FIG. 11, it is assumed that the service instantiation being invoked is already running on the backend server. FIG. 11 starts at block 1100. In block 1102, the FileService component receives data from the server manager component (through the server manager component extension, which is the OpenAdmin extension in the specific example herein) data regarding the FileService instantiation to be administered. Examples of such data include the network server address of the server to be administered and optionally, any shared data such as session ID, and the like. In block 1104, the FileService component establishes a logical network session with the server associated with the received server address. In one embodiment, this logical session represents an AFP (Apple File Protocol) session. If the logical session is successfully established, the data regarding the file system hierarchy is downloaded from that server to the FileService component in block 1106. Such file system hierarchy includes, in the case of the FileService component, information such as a list of volumes, files, folders, and the like on the server associated with the received server address. If such a logical network session cannot be established, e.g., as in the case when the backend server is not turned on or the network connection is not enabled, an error message is preferably displayed to inform the network administrator of the problem.

In block 1108, the service administration window associated with FileService is displayed, along with the data received in block 1106 in the appropriate subcomponent of the service administration component. As mentioned earlier, the service administration component associated with this window may include many subcomponents. Examples of such subcomponents include management functions related to access control, activity monitor, log file, and the like as shown in FileService administration window 200 of FIG. 5B. The steps of FIG. 11 end at block 1110.

It should be borne in mind that although the invention is described using flow diagrams as an illustration aid, it should be noted that the methods and apparatus of the present invention may be event-driven, capable of executing multiple processes at the same time. As such, different processes and tasks do not necessarily have to be performed in the specific sequential order chosen for illustration, and a computer and/or software program implementing the inventive method may be executing other tasks while executing the inventive method disclosed herein.

Further, while this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

---

Appendix A

Class Definition for Service Object

```
#ifndef _OAGETSERVICES_
define _OAGETSERVICES_ include <somobj.idl>
include <somcls.idl> ifndef _ODTYPESM_
include "ODTypesM.idl"
#endif

//==========================================
// Classes defined in this interface
//========================================== interface OAGetServices;

//==========================================
// Classes used by this interface
//========================================== interface ODFrame;
interface ODPart;

//==========================================
// Definitions for OAGetServices
//========================================== typedef somToken    StringPtr;
typedef somToken    Ptr;
typedef somToken    Handle;

//==========================================
// OAGetServices
//========================================== interface OAGetServices: SOMObject
{
    // Initialize the service object.

// Setup its field informations by reading from its resource file
    void    Initialize(in short stringListID, in short iconFamilyID);

// Get the service type name (eg. file server service type, print
    server service type, etc.)
```

---

-continued

Appendix A

Class Definition for Service Object

```
    void    GetServiceName(in StringPtr serviceName);

// Get the service icon
    Handle  GetIconSuite( );

// Get the service GetInfo part kind in order to invoke the right
    component
    // for this service get info component.
    char*   GetGetInfoPartKind( );

// Get the service Administration part kind in order to invoke the
    right - component
    // for this service administration component.
    char*   GetAdminPartKind( );

// Get the service UserGroup part kind in order to invoke the
    right component
    // for this service UserGroup component.
    char*   GetUGBrowserPartKind( );

// Set the service type name (eg. file server service type, print
    server service type, etc.)
    void    SetServiceName(in StringPtr serviceName);

// Set the service icon
    void    SetIconSuite(in Handle suite);

// Set the service GetInfo part kind.
    void    SetGetInfoPartKind(in char* kind);

// Set the service Administration part kind.
    void    SetAdminPartKind(in char* kind);

// Set the service UserGroup part kind
    void    SetUGBrowserPartKind(in char* kind);

// Set the new selected zone name
    void    SetZoneName(in StringPtr zoneName);

// Get one service status by providing a data structure of
    information regarding
    // this specific service.
    void    GetOneServiceStatus(in Ptr servicePBPtr);

// Service object starts to find all of its services in the network.
    void    EnumServices(in Ptr servicePBPtr);

#ifdef _SOMIDL_
    implementation
    {
    functionprefix = OAGetServices_;

override:
        somInit,
        somUninit;

releaseorder:
        Initialize,
        GetServiceName,
        GetIconSuite,
        GetGetInfoPartKind,
        GetAdminPartKind,
        GetUGBrowserPartKind,
        SetServiceName,
        SetIconSuite,
        SetGetInfoPartKind,
        SetAdminPartKind,
        SetUGBrowserPartKind,
        SetZoneName,
        GetOneServiceStatus,
        EnumServices;

#ifdef _PRIVATE_
        StringPtr   fServiceName;
        Handle      fIconSuite;
        char*       fGetInfoPartKind;
```

-continued

Appendix A

Class Definition for Service Object

```
        char*      fAdminPartKind;
        char*      fUGBrowserPartKind;
    #endif
    };
#endif
};

#endif // _OAGETSERVICES_
```

What is claimed is:

1. A remote network administration apparatus for managing network services on a plurality of network servers in a computer network, comprising:
   a component repository, said component repository containing service components, each of said service components corresponds to one of said network services;
   a service object, said service object being associated with a first one of said service components, said service object, when executed, communicates with said plurality of network servers to obtain network service instantiation data relating to instantiations of a first one of said network services on said plurality of network servers, said first one of said network services being a network service that corresponds to said first one of said service components;
   a server manager component for receiving said network service instantiation data from said service object;
   a server manager window representing the user interface component for said server manager component, said server manager window displaying a status of said instantiations responsive to said network service instantiation data.

2. The remote network administration apparatus of claim 1 wherein said server manager window is capable of receiving a human-input administration command related to a first one of said instantiations and passing said human-input administration command to said server manager component, thereby permitting said server manager component to administer said first one of said instantiations responsive to said human-input administration command.

3. The remote network administration apparatus of claim 2 wherein said human-input administration command comprises a command for managing a list of users having access to said first one of said instantiations.

4. The remote network administration apparatus of claim 3 further comprising a user/group manager component, said user/group manager component receives a network server address from said server manager component when said command for managing a list of users having access to said first one of said instantiations is received by said server manager component, said network server address being an address of a network server on which said first one of said instantiations is installed, said user/group manager component, responsive to a receipt of said network server address, communicates with said network server on which said specified one of said instantiations is installed to obtain data regarding users having access to said first one of said instantiations.

5. The remote network administration apparatus of claim 1 wherein said service object encapsulates service-specific details from said server manager component, thereby permitting said server manager component to obtain said network service instantiation data through said service object even though said server manager component has no knowledge of said service-specific details.

6. The remote network administration apparatus of claim 5 wherein said service-specific details include a function of said network service.

7. The remote network administration apparatus of claim 1 wherein said service object encapsulates network-specific details from said server manager component, thereby permitting said server manager component to obtain said network service instantiation data through said service object even though said server manager component has no knowledge of said network-specific details.

8. The remote network administration apparatus of claim 7 wherein said network-specific details include a communication protocol of said computer network.

9. The remote network administration apparatus of claim 8 wherein said network-specific details include how many network servers there are in said plurality of network servers.

10. The remote network administration apparatus of claim 1 wherein said service object is a system object module.

11. In a computer network having a plurality of network servers, a method for managing network services on said plurality of network servers, comprising:
    providing at least one service component in a component repository, said service component corresponds to one of said network services;
    providing a server manager component, said server manager component communicates with said component repository to ascertain the presence of said service component;
    executing a service object associated with said service component, said service object communicates with said plurality of network servers to obtain network service instantiation data relating to instantiations of said one of said network services on said plurality of network servers; and
    passing said network service instantiation data to a server manager window component for displaying a status of said instantiations responsive to said network service instantiation data.

12. The method of claim 11 further comprising:
    receiving through said server manager window a human-input administration command related to a first one of said instantiations; and
    passing said human-input administration command to said server manager component, thereby permitting said server manager component to administer said first one of said instantiations responsive to said human-input administration command.

13. The method of claim 12 wherein said human-input administration command comprises a command for managing a list of users having access to said first one of said instantiations.

14. The method of claim 13 further comprising:
    receiving through a user/group manager component a network server address from said server manager component when said command for managing a list of users having access to said first one of said instantiations is received by said server manager component, said network server address being an address of a network server on which said first one of said instantiations is installed;
    communicating between said user/group manager component and said network server on which said specified one of said instantiations is installed, responsive to a receipt of said network server address, to obtain data regarding users having access to said first one of said instantiations.

15. The method of claim 11 wherein said service object encapsulates service-specific details from said server manager component, thereby permitting said server manager component to obtain said network service instantiation data through said service object even though said server manager component has no knowledge of said service-specific details.

16. The remote network administration apparatus of claim 15 wherein said service-specific details include a function of said network service.

17. The remote network administration apparatus of claim 11 wherein said service object encapsulates network-specific details from said server manager component, thereby permitting said server manager component to obtain said network service instantiation data through said service object even though said server manager component has no knowledge of said network-specific details.

18. The remote network administration apparatus of claim 17 wherein said network-specific details include a communication protocol of said computer network.

19. A computer readable medium containing program instructions for managing network services on a plurality of network servers in a computer network, said computer readable medium comprising instructions for:

providing at least one service component in a component repository, said service component corresponds to one of said network services;

providing a server manager component, said server manager component communicates with said component repository to ascertain the presence of said service component;

executing a service object associated with said service component, said service object communicates with said plurality of network servers to obtain network service instantiation data relating to instantiations of said one of said network services on said plurality of network servers; and passing said network service instantiation data to a server manager window component for displaying a status of said instantiations responsive to said network service instantiation data.

20. The computer readable medium of claim 19 further comprising:

receiving through said server manager window a human-input administration command related to a first one of said instantiations; and passing said human-input administration command to said server manager component, thereby permitting said server manager component to administer said first one of said instantiations responsive to said human-input administration command.

* * * * *

UNITED STATES PATENT AND TRADEMARK OFFICE
CERTIFICATE OF CORRECTION

PATENT NO. : 5,748,896
DATED : May 5, 1998
INVENTOR(S) : Daly et al.

It is certified that error appears in the above-indentified patent and that said Letters Patent is hereby corrected as shown below:

Column 12, line 19, after "1995" insert --(U.S. patent Serial No. 08/552,942, issued as U.S. Patent No. 5,729,734)--.

Signed and Sealed this

Twenty-eighth Day of July, 1998

*Attest:*

BRUCE LEHMAN

*Attesting Officer*      *Commissioner of Patents and Trademarks*